(12) United States Patent
Miyahara et al.

(10) Patent No.: US 7,581,879 B2
(45) Date of Patent: Sep. 1, 2009

(54) TEMPERATURE SENSOR

(75) Inventors: Akihiro Miyahara, Aichi (JP); Go Hanzawa, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 345 days.

(21) Appl. No.: 11/168,435

(22) Filed: Jun. 29, 2005

(65) Prior Publication Data

US 2006/0176931 A1    Aug. 10, 2006

(30) Foreign Application Priority Data

Jun. 30, 2004    (JP)    ............................. 2004-194182

(51) Int. Cl.
G01K 1/00    (2006.01)
G01K 13/00    (2006.01)

(52) U.S. Cl. ...................... 374/148; 374/208

(58) Field of Classification Search ................. 374/183, 374/185, 208; 338/28, 229
See application file for complete search history.

(56) References Cited

U.S. PATENT DOCUMENTS

| | | | | |
|---|---|---|---|---|
| 3,913,058 A * | 10/1975 | Nishio et al. ................... | 338/28 |
| 5,380,092 A * | 1/1995 | Alain ........................... | 374/160 |
| 6,286,995 B1 * | 9/2001 | Takahashi et al. ........... | 374/148 |
| 6,466,123 B1 * | 10/2002 | Kuzuoka et al. ............... | 338/25 |
| 6,639,505 B2 * | 10/2003 | Murata et al. ................. | 338/25 |
| 6,698,922 B2 * | 3/2004 | Adachi et al. ............... | 374/208 |
| 6,776,524 B2 * | 8/2004 | Park et al. .................... | 374/179 |
| 6,857,776 B2 * | 2/2005 | Park .......................... | 374/179 |
| 6,880,969 B2 * | 4/2005 | Adachi et al. ............... | 374/185 |
| 6,997,607 B2 * | 2/2006 | Iwaya et al. ................. | 374/208 |
| 7,104,685 B2 * | 9/2006 | Hanzawa et al. ............. | 374/208 |
| 7,121,722 B2 * | 10/2006 | Hanzawa et al. ............. | 374/185 |
| 2002/0039378 A1 * | 4/2002 | Shibayama .................. | 374/148 |
| 2002/0131477 A1 * | 9/2002 | Kurano ....................... | 374/185 |
| 2005/0265426 A1 * | 12/2005 | Hanzawa et al. ............. | 374/208 |

FOREIGN PATENT DOCUMENTS

| JP | 52-124377 | 10/1977 |
| JP | 62-278421 | 12/1987 |
| JP | 2000-162051 | 6/2000 |
| JP | 2002-350239 | 12/2002 |
| JP | 2005-241395 | 9/2005 |

* cited by examiner

*Primary Examiner*—Gail Verbitsky
*Assistant Examiner*—Mirellys Jagan
(74) *Attorney, Agent, or Firm*—Sughrue Mion, PLLC (57) ABSTRACT

A mounting member 4 of a temperature sensor 1 has a vibration-resisting reinforcement portion 47 between a mounting seat 45 and a joint portion 43, so as to surround a longitudinally long portion of a sheath member 8 and thereby narrowly limit its movable range.

18 Claims, 5 Drawing Sheets

TEMPERATURE SENSOR

BACKGROUND OF THE INVENTION

1. Field of the Invention

The present invention relates to a temperature sensor having as a temperature-sensitive element, a thermistor formed from a semiconductor such as a metal oxide, a metal resistor, or the like accommodated in a metal cap or a metal tube.

2. Description of the Related Art

A conventionally known temperature sensor includes a sheath member which insulates and holds metal core wires connected at their tip ends to a temperature-sensitive element and connected at their rear ends to corresponding lead wires for connection to an external circuit; a metal cap circumferentially joined to the sheath member while accommodating the temperature-sensitive element therein; and a mounting member supporting the sheath member with the metal cap and a tip end portion of the sheath member exposed to the exterior thereof, and having a mounting seat adapted to abut a sensor-mounting seat (Patent Document 1 (FIG. 4) and Patent Document 2 (FIG. 1)).

Another known temperature sensor includes a longitudinally extending metal tube having a closed tip end; a temperature-sensitive element accommodated within the metal tube and having an electric characteristic that varies with temperature; and a mounting member supporting the metal tube with a tip end portion of the metal tube exposed to the exterior thereof, and having a mounting seat adapted to abut a sensor-mounting seat (Patent Document 1 (FIGS. 1 and 2)).

These temperature sensors are used to detect the temperature of a measurement object (exhaust gas or the like) in an environment subject to strong vibrations, such as the interior of an automotive catalytic converter, an automotive exhaust pipe, or the like.

[Patent Document 1] Japanese Patent Application Laid-Open (kokai) No. 2002-350239

[Patent Document 2] Japanese Patent Application Laid-Open (kokai) No. 2000-162051

3. Problems to be Solved by the Invention

However, in the case where the resonance frequencies (primary resonance frequencies) of the above-mentioned conventional temperature sensors overlap a frequency band of vibrations generated in an environment where the temperature sensors are installed, there is the risk of breaking a wire or an electric path within the temperature sensor, breakage of the sheath member or the metal tube, or a like problem.

Particularly, when a tip end projection length as measured longitudinally between the mounting seat of the mounting member and the tip end of the metal cap is long, the resonance frequency of a sensor is highly likely to overlap a frequency band of vibrations generated in an environment where the sensor is installed.

A conceivable remedy, for example, is to shorten the longitudinal distance between the mounting seat of the mounting member of the temperature sensor and the tip end of the metal cap (or the metal tube) (tip end projection length).

However, in certain environments where a sensor is installed, a long distance lies between a temperature-detecting position and a sensor-mounting seat that the mounting seat of the sensor abuts. In application to such an environment, shortening of the tip end projection length is limited, so that there is a need to prevent the wires from breaking or to prevent other breakage due to resonance.

SUMMARY OF THE INVENTION

The present invention has been accomplished in view of the above problems, and it is therefore an object of the invention to provide a temperature sensor which is adapted to detect the temperature of a measurement object in an environment subject to strong vibrations, such as an exhaust or intake pipe of an internal combustion engine, a hydrogen pipe of a fuel-cell vehicle, or the like and which is free from wire breakage or other breakage due to resonance even when there is a long distance between a sensor-mounting seat and a temperature-detecting position.

In a first aspect (1), the above objects of the present invention have been achieved by providing a temperature sensor comprising: a temperature-sensitive element having an electric characteristic that varies with temperature; a sheath member including a metal core wire connected at a tip end thereof to the temperature-sensitive element, and connected at a rear end thereof to a lead wire for connection to an external circuit; a metal cap accommodating the temperature sensitive element therein, and joined to a tip end portion of the sheath member; a mounting member having a supporting portion supporting the sheath member, and a mounting seat adapted to abut a sensor-mounting seat directly or indirectly via another member; a joint portion having an outer diameter smaller than a maximum outer diameter of the mounting seat, joined to a portion of the sheath member located closer to the metal cap than the supporting portion and the mounting seat; and a vibration-resisting reinforcement portion having an outer diameter greater than a maximum outer diameter of the joint portion and smaller than the maximum outer diameter of the mounting seat, and surrounding a portion of the sheath member arranged between the mounting seat and the joint portion, wherein a tip end projection length as measured between the mounting seat of the mounting member and a tip end of the metal cap is 20 mm or more.

Because the temperature sensor of the present invention has a long tip end projection length of 20 mm or more as measured between the mounting seat and the tip end of the metal cap, the temperature sensor can be used in an environment entailing a long distance between the sensor-mounting seat and the temperature detection position.

Since the mounting member of the temperature sensor of the present invention has a vibration-resisting reinforcement portion arranged between the mounting seat and the joint portion, the mounting member can surround a longitudinally long portion of the sheath member in contrast with a mounting member having no vibration-resisting reinforcement portion.

Since the vibration-resisting reinforcement portion has an outer diameter greater than the maximum outer diameter of the joint portion, the vibration-resisting reinforcement portion has a greater wall thickness than the joint portion and thus has enhanced strength. Thus, the mounting member having the vibration-resisting reinforcement portion between the mounting seat and the joint portion has an overall strength higher than that of a mounting member having no vibration-resisting reinforcement portion or a mounting member in which a joint portion is merely elongated in the longitudinal direction without employing a vibration-resisting reinforcement portion, so that the mounting member can more firmly support the sheath member against vibration. Accordingly, in contrast with a temperature sensor whose mounting member does not have a vibration-resisting reinforcement portion, the temperature sensor of the present invention has enhanced resistance to vibration and exhibits a shift in resonance frequency; i.e., the resonance frequency of the temperature sensor can be set within a frequency band different from that of vibrations generated in an environment where the temperature sensor is installed.

Since the vibration-resisting reinforcement portion has an outer diameter smaller than the maximum outer diameter of the mounting seat, when the temperature sensor is to be placed on a sensor-mounting seat, the vibration-resisting reinforcement portion does not interfere with the sensor-mounting seat.

Even in applications similar to those employing a conventional temperature sensor having no vibration-resisting reinforcement portion, the temperature sensor of the present invention having a vibration-resisting reinforcement portion can be set such that the mounting seat of the mounting member abuts a sensor-mounting seat as in the case of a conventional temperature sensor. Therefore, the position of the temperature-sensitive element when the temperature sensor is installed can be determined in relation to the mounting seat of the mounting member as in the case of a conventional temperature sensor.

Since the resonance frequency of the temperature sensor of the present invention can be set within a frequency band different from that of vibrations generated in an environment where the temperature sensor is installed, even when used in an environment entailing a long distance between the sensor-mounting seat and the temperature detection position, the temperature sensor can be free from wire or sheath member breakage caused by resonance.

No particular limitation is imposed on the means for joining together the sheath member and the joint portion of the mounting member. Examples of useful joining means include crimping, laser welding, plasma welding, argon arc welding, electron beam welding and brazing.

The maximum outer diameter of the joint portion is defined by the diameter of a largest circle that circumscribes a maximum cross-sectional geometry of the joint portion taken perpendicular to the longitudinal direction. The maximum outer diameter of the mounting seat is defined by the diameter of a largest circle that circumscribes a maximum cross-sectional geometry of the mounting seat taken perpendicular to the longitudinal direction.

In a preferred embodiment (2) of the above-described temperature sensor (1), the longitudinal (axial) length of the vibration-resisting reinforcement portion is 20% to 60% of the tip end projection length.

By forming the vibration-resisting reinforcement portion such that the longitudinal length thereof is 20% or more of the tip end projection length, the strength of the mounting member is reliably increased, so that the mounting member can more firmly support the sheath member against vibration. A temperature sensor having such a vibration-resisting reinforcement portion can be fabricated so as to surely have a resonance frequency different from that of a temperature sensor having no vibration-resisting reinforcement portion.

By forming the vibration-resisting reinforcement portion such that the longitudinal length thereof becomes 60% or less of the tip end projection length, shortening of the distance between the mounting member and the temperature-sensitive element is avoided, thereby avoiding an increase in thermal capacity of a portion of the temperature sensor located in the vicinity of the temperature-sensitive element. Accordingly, even when the temperature of a measurement object changes abruptly, a change in temperature of the temperature-sensitive element follows that of the measurement object without long delay, thereby preventing impaired response of the temperature sensor.

Since the resonance frequency of the temperature sensor of the present invention can be set within a frequency band different from that of vibrations generated in an environment where the temperature sensor is installed, the temperature sensor can be free from wire or sheath member breakage caused by resonance, and impaired response to a change in temperature of a measurement object can be prevented, thereby preventing a decrease in detection accuracy of the temperature sensor.

Preferably, for reliably avoiding an increase in thermal capacity of a portion of the temperature sensor located in the vicinity of the temperature-sensitive element, while the longitudinal length of the vibration-resisting reinforcement portion is set to 20% to 60% of the tip end projection length, the total longitudinal length of the vibration-resisting reinforcement portion and the joint portion is set to 70% or less of the tip end projection length.

In yet another preferred embodiment (3) of the above-described temperature sensor (1), the difference between the outer diameter of a portion of the sheath member surrounded by the vibration-resisting reinforcement portion and the inner diameter of the vibration-resisting reinforcement portion is 0 mm to 0.3 mm.

By setting the difference between the outer diameter of the sheath member and the inner diameter of the vibration-resisting reinforcement portion to at least 0.3 mm or less, the mounting member can limit the movable range of a portion of the sheath member surrounded by the vibration-resisting reinforcement portion. This enables the temperature sensor having such a vibration-resisting reinforcement portion to have a resonance frequency different from that of a temperature sensor having no vibration-resisting reinforcement portion.

Particularly, when the difference between the outer diameter of the sheath member and the inner diameter of the vibration-resisting reinforcement portion is 0 mm, the inner circumferential surface of the vibration-resisting reinforcement portion and the outer circumferential surface of the sheath member abut one another. Accordingly, the mounting member can limit movement of the sheath member not only at the joint portion, but also at the vibration-resisting reinforcement portion, so that the mounting member can reliably support the sheath member.

In yet another preferred embodiment (4) of the above-described temperature sensor (1), the joint portion and the vibration-resisting reinforcement portion are integrally formed with the mounting member.

In contrast with the case where the joint portion, the vibration-resisting reinforcement portion, and the mounting member are formed as separate members, integral formation of the joint portion, the vibration-resisting reinforcement portion and the mounting member can reduce the cost of forming work.

In contrast with the case where the joint portion, the vibration-resisting reinforcement portion, and the mounting member are formed as separate members and then joined together, integral formation of the joint portion, the vibration-resisting reinforcement portion and the mounting member can maintain good strength with respect to joining between the mounting member and the vibration-resisting reinforcement portion and joining between the joint portion and the vibration-resisting reinforcement portion.

In a second aspect (5), the above object of the invention is achieved by providing a temperature sensor comprising: an axially extending metal tube; a temperature-sensitive element accommodated in a tip end portion of the metal tube and having an electric characteristic that varies with temperature; a mounting member having a supporting portion supporting the metal tube, and a mounting seat adapted to abut a sensor-mounting seat directly or indirectly via another member; a joint portion having an outer diameter smaller than a maximum outer diameter of the mounting seat and joined to a portion of the metal tube located on a side toward a tip end of the temperature sensor with respect to the mounting seat; and a vibration-resisting reinforcement portion having an outer diameter greater than a maximum outer diameter of the joint portion and smaller than the maximum outer diameter of the mounting seat and surrounding a portion of the metal tube arranged between the mounting seat and the joint portion, wherein a tip end projection length as measured between the mounting seat of the mounting member and a tip end of the metal tube is 20 mm or more.

Since the temperature sensor of the above aspect (5) of the present invention has a long tip end projection length of 20 mm or more as measured between the mounting seat and the tip end of the metal tube, the temperature sensor can be used in an environment entailing a long distance between the sensor-mounting seat and the temperature detection position.

Since the mounting member of the temperature sensor of the present invention has a vibration-resisting reinforcement portion between the mounting seat and the joint portion, the mounting member can surround a longitudinally long portion of the metal tube in contrast with a mounting member having no vibration-resisting reinforcement portion.

Since the vibration-resisting reinforcement portion has an outer diameter greater than the maximum outer diameter of the joint portion, the vibration-resisting reinforcement portion has a greater wall thickness than the joint portion and thus has enhanced strength. Thus, the mounting member having the vibration-resisting reinforcement portion between the mounting seat and the joint portion has an overall strength higher than that of a mounting member having no vibration-resisting reinforcement portion or a mounting member in which a joint portion is merely elongated in the longitudinal direction without employing a vibration-resisting reinforcement portion. As such, the mounting member can more firmly support the metal tube against vibration. Accordingly, in contrast with a temperature sensor whose mounting member does not have a vibration-resisting reinforcement portion, the temperature sensor of the present invention has enhanced resistance to vibration and exhibits a shift in resonance frequency; i.e., the resonance frequency of the temperature sensor can be set within a frequency band different from that of vibrations generated in an environment where the temperature sensor is installed.

Since the vibration-resisting reinforcement portion has an outer diameter smaller than the maximum outer diameter of the mounting seat, when the temperature sensor is to be placed on a sensor-mounting seat, the vibration-resisting reinforcement portion does not interfere with the sensor-mounting seat.

Even in applications similar to those employing a conventional temperature sensor having no vibration-resisting reinforcement portion, the temperature sensor of the present invention having a vibration-resisting reinforcement portion can be set such that the mounting seat of the mounting member abuts a sensor-mounting seat as in the case of a conventional temperature sensor. Therefore, the position of the temperature-sensitive element when the temperature sensor is installed can be determined in relation to the mounting seat of the mounting member as in the case of a conventional temperature sensor.

Since the resonance frequency of the temperature sensor of the present invention can be set within a frequency band different from that of vibrations generated in an environment where the temperature sensor is installed, even when used in an environment entailing a long distance between the sensor-mounting seat and the temperature detection position, the temperature sensor can be free from wire or metal tube breakage caused by resonance.

No particular limitation is imposed on the means for joining together the metal tube and the joint portion of the mounting member. Examples of useful joining means include crimping, laser welding, plasma welding, argon arc welding, electron beam welding and brazing.

Preferably, in the above-described temperature sensor (5), as described in a preferred embodiment (6), the longitudinal length of the vibration-resisting reinforcement portion is 20% to 60% of the tip end projection length.

By forming the vibration-resisting reinforcement portion such that the longitudinal length thereof is 20% or more of the tip end projection length, the strength of the mounting member is reliably increased, so that the mounting member can more firmly support the metal tube against vibration. The temperature sensor having such a vibration-resisting reinforcement portion can be fabricated so as to surely have a resonance frequency different from that of a temperature sensor having no vibration-resisting reinforcement portion.

By forming the vibration-resisting reinforcement portion such that the longitudinal length thereof becomes 60% or less of the tip end projection length, shortening of the distance between the mounting member and the temperature-sensitive element is avoided, thereby avoiding an increase in thermal capacity of a portion of the temperature sensor located in the vicinity of the temperature-sensitive element. Accordingly, even when the temperature of a measurement object changes abruptly, a change in temperature of the temperature-sensitive element follows that of the measurement object without long delay, thereby preventing impaired response of the temperature sensor.

Since the resonance frequency of the temperature sensor of the present invention can be set within a frequency band different from that of vibrations generated in an environment where the temperature sensor is installed, the temperature sensor can be free from wire or metal tube breakage caused by resonance, and impaired response to a change in temperature of a measurement object can be prevented, thereby preventing a decrease in detection accuracy of the temperature sensor.

Preferably, for reliably avoiding an increase in thermal capacity of a portion of the temperature sensor located in the vicinity of the temperature-sensitive element, while the longitudinal length of the vibration-resisting reinforcement portion is set to 20% to 60% of the tip end projection length, the total longitudinal length of the vibration-resisting reinforcement portion and the joint portion is set to 70% or less of the tip end projection length.

In yet another preferred embodiment (7) of the above-described temperature sensor (5) having the metal tube, the difference between the outer diameter of a portion of the metal tube surrounded by the vibration-resisting reinforcement portion and the inner diameter of the vibration-resisting reinforcement portion is 0 mm to 0.3 mm.

By setting the difference between the outer diameter of the metal tube and the inner diameter of the vibration-resisting reinforcement portion to 0.3 mm or less, the mounting member can limit the movable range of a portion of the metal tube surrounded by the vibration-resisting reinforcement portion. In contrast with a temperature sensor having no vibration-resisting reinforcement portion, this enables the temperature sensor having such a vibration-resisting reinforcement portion to assume a resonance frequency different from environmental vibration frequencies.

Particularly, when the difference between the outer diameter of the metal tube and the inner diameter of the vibration-resisting reinforcement portion is 0 mm, the inner circumferential surface of the vibration-resisting reinforcement portion and the outer circumferential surface of the metal tube abut one another. Accordingly, the mounting member can limit movement of the metal tube not only at the joint portion, but also at the vibration-resisting reinforcement portion, so that the mounting member can reliably support the metal tube.

In yet another preferred embodiment (8), in the above-described temperature sensor (5), the joint portion and the vibration-resisting reinforcement portion are integrally formed with the mounting member.

In contrast with the case where the joint portion, the vibration-resisting reinforcement portion, and the mounting member are formed as separate members, integral formation of the joint portion, the vibration-resisting reinforcement portion and the mounting member can reduce the cost of forming work.

In contrast with the case where the joint portion, the vibration-resisting reinforcement portion and the mounting member are formed as separate members and then joined together, integral formation of the joint portion, the vibration-resisting reinforcement portion and the mounting member can maintain strength in good condition with respect to joining between the mounting member and the vibration-resisting reinforcement portion and joining between the joint portion and the vibration-resisting reinforcement portion.

DESCRIPTION OF REFERENCE NUMERALS

Reference numerals used to identify various structural features in the drawings include the following.
1: temperature sensor
2: thermistor element
4: mounting member
7: metal core wire
8: sheath member
11: crimp terminal
12: lead wire
14: metal cap
43: joint portion
45: mounting seat
47: vibration-resisting reinforcement portion
48: seal ring
101: second temperature sensor
104: second mounting member
108: second sheath member
114: metal tube
143: second joint portion
147: second vibration-resisting reinforcement portion
201: third temperature sensor
204: third mounting member
243: third joint portion
245: third mounting seat
247: third vibration-resisting reinforcement portion
301: fourth temperature sensor
304: fourth mounting member
343: fourth joint portion
345: fourth mounting seat
347: fourth vibration-resisting reinforcement portion

DETAILED DESCRIPTION OF THE PREFERRED EMBODIMENTS

Preferred embodiments of the present invention will next be described by reference to the drawings However, the present invention should not be construed as being limited thereto.

Figure 1:
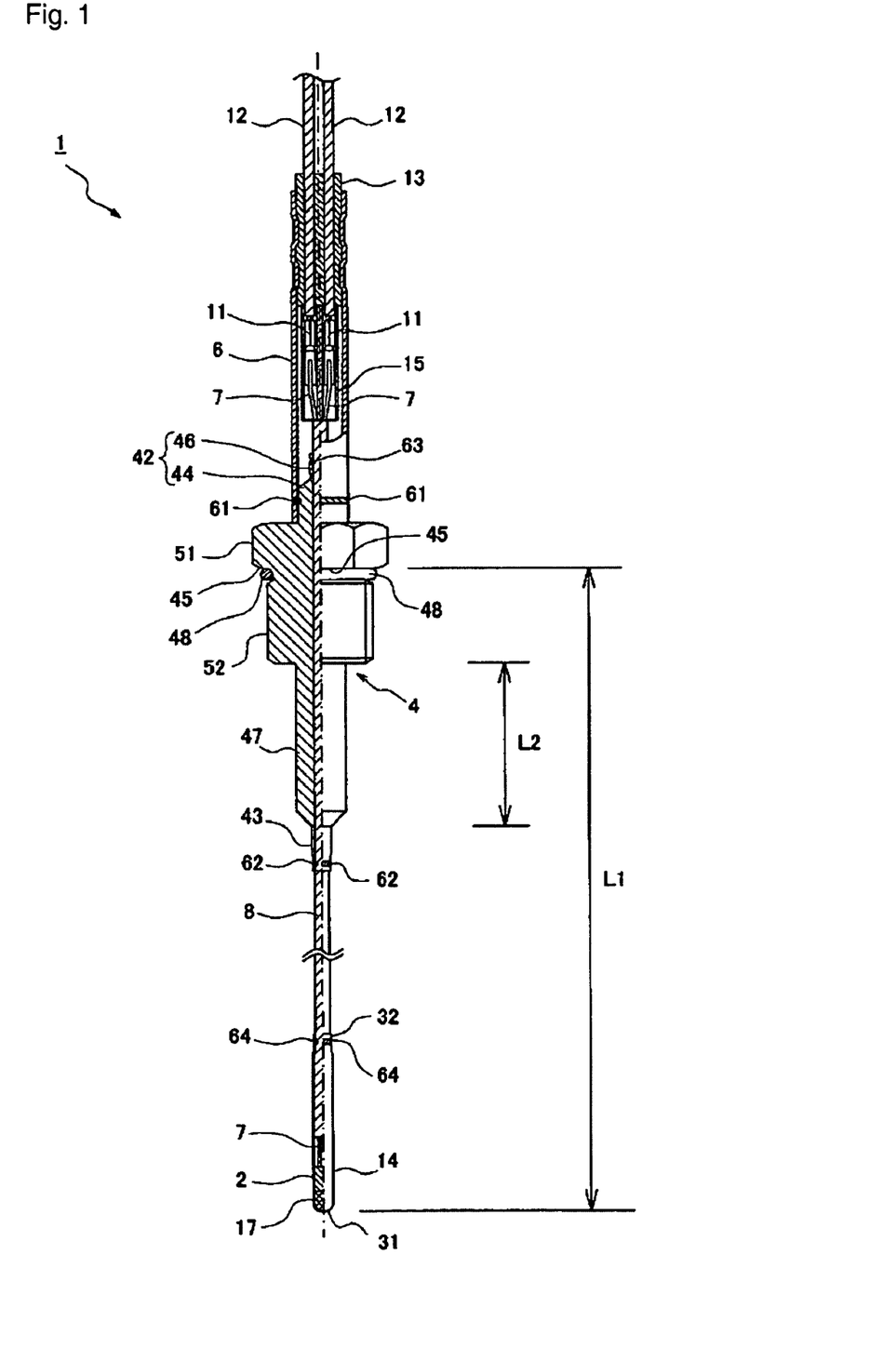
FIG. 1 is a fragmentary sectional view showing the structure of a temperature sensor which represents a first embodiment in accordance with the invention.

FIG. 1 is a fragmentary sectional view showing the structure of a temperature sensor 1 according to an embodiment of the present invention.

The temperature sensor 1 includes a sheath member 8 insulating and holding a pair of metal core wires 7; a longitudinally extending tubular metal cap 14 having a closed tip end; and a mounting member 4 supporting the sheath member 8. The longitudinal direction of the temperature sensor corresponds to the vertical direction in FIG. 1. The tip-end side corresponds to a downward side, and the rear-end side of the temperature sensor 1 corresponds to an upward side in FIG. 1.

The temperature sensor 1 has a thermistor element 2 serving as a temperature-sensitive element in the interior of the metal cap 14. The temperature sensor 1 can be mounted, for example, to an intake pipe of an internal combustion engine, a hydrogen pipe of a fuel-cell vehicle, or a like flow pipe such that the thermistor element 2 is located in the flow pipe through which a measurement gas flows, so as to detect the temperature of the measurement gas. That is, the temperature sensor 1 corresponds to a so-called vehicular temperature sensor. The thermistor element 2 varies in electrical characteristic (electric resistance) with temperature.

The paired metal core wires 7 are connected at their tip ends to corresponding electrode wires of the thermistor element 2 by resistance welding and are connected at their rear ends to corresponding crimp terminals 11 by resistance welding. The rear ends of the metal core wires 7 are connected via the crimp terminals 11 to corresponding lead wires 12 for connection to an external circuit (e.g., an electronic control unit (ECU) of a vehicle).

The paired metal core wires 7 are insulated from each other by an insulation tube 15, which also insulates the paired crimp terminals 11 from one another. Each of the lead wires 12 is a conductor covered with an insulative covering material. The lead wires 12 extend through an auxiliary ring 13 formed of heat-resistant rubber.

Although unillustrated in detail, the sheath member 8 includes a metal sleeve; the paired metal core wires 7 formed of a conductive metal; and an insulating powder electrically insulating the sleeve and the two metal core wires 7 from one another and supporting the metal core wires 7.

The metal cap 14 is formed of a corrosion-resistant metal (e.g., stainless steel alloy such as SUS316) and assumes a longitudinally extending tubular form in which a tip end 31 is closed, whereas a tubular rear-end portion 32 is opened. The metal cap 14 contains the thermistor element 2 and an epoxy vibration-insulating material 17 in a tip end portion thereof. The rear-end portion 32 is fixed to the sheath member 8 by circumferential crimping and electron beam welding with the inner circumferential surface of the rear-end portion 32 overlying the outer circumferential surface of the sheath member 8.

The welding work forms a cap weld zone 64 penetrating the rear-end portion 32 of the metal cap 14 and the sheath member 8 (more specifically, the sleeve of the sheath member 8).

The mounting member 4 formed of metal includes a hexagonal nut portion 51 projecting radially outward; a threaded portion 52; and a rear-end sheath portion 42 extending longitudinally rearward from the rear end of the hexagonal nut portion 51. The mounting member 4 further includes a mounting seat 45 which is formed as the front end surface of the hexagonal nut portion 51; a joint portion 43 joined to a portion of the sheath member 8 located on the tip-end side with respect to the mounting seat 45; and a vibration-resisting reinforcement portion 47 surrounding, from all radial directions, a portion of the sheath member 8 located between the mounting seat 45 and the joint portion 43.

The mounting member 4 supports the sheath member 8 while surrounding an outer circumferential surface of the sheath member 8 with at least the metal cap 14 and a tip end portion of the sheath member 8 exposed to the exterior thereof.

The mounting member 4 is fixed to a sensor-mounting seat formed on a flow pipe while an annular seal ring 48 formed of an elastic material (e.g., heat-resistant rubber) lies on the tip-end side of the mounting seat 45. The mounting seat 45 contacts the sensor-mounting seat (sensor-mounting surface) indirectly via the seal ring 48, thereby preventing formation of a clearance between the temperature sensor 1 and the flow pipe and thus preventing leakage of measurement gas to the exterior of the flow pipe.

The mounting member 4 is fixed to the sensor-mounting seat by engaging the threaded portion 52 with a threaded hole formed in the sensor-mounting seat. The position of the mounting member 4 at the sensor-mounting seat with respect to the insertion direction is determined by means of the mounting seat 45 which comes into indirect contact with the sensor-mounting seat via the seal ring 48.

The joint portion 43 assumes an annular form to permit insertion of the sheath member 8 therethrough and is joined to the sheath member 8 while surrounding the sheath member 8 from all radial directions. The joint portion 43 has a thin wall thickness (difference between the outer diameter and the inner diameter) so as to be deformable when crimped.

The rear-end sheath portion 42 assumes a two-stepped annular form consisting of a first stepped portion 44 and a second stepped portion 46 located rearward of the first stepped portion 44 and having an outer diameter smaller than that of the first stepped portion 44. The second stepped portion 46 has a thin wall thickness (difference between the outer diameter and the inner diameter) so as to be deformable when crimped.

After the sheath member 8 is inserted through the mounting member 4, the mounting member 4 is subjected to radially inward crimping and electron beam welding at the joint portion 43 and the second stepped portion 46, to thereby support the sheath member 8 while surrounding an outer circumferential surface of the sheath member 8. That is, the sheath member 8 is fixed to the mounting member 4 by virtue of being joined to the joint portion 43 and the second stepped portion 46.

The welding work forms a tip-end side weld zone 62 penetrating the joint portion 43 and the sheath member 8 (more specifically, the sleeve of the sheath member 8), and a rear-end side weld zone (supporting portion) 63 penetrating the second stepped portion 46 and the sheath member 8 (more specifically, the sleeve of the sheath member 8).

Furthermore, the relative position between the mounting member 4 and the sheath member 8 is set such that a tip end projection length L1 as measured longitudinally between the mounting seat 45 of the mounting member 4 and the tip end of the metal cap 14 becomes 45 mm.

The vibration-resisting reinforcement portion 47 assumes an annular form to permit insertion of the sheath member 8 therethrough. With the sheath member 8 being fixed to the mounting member 4, the vibration-resisting reinforcement portion 47 surrounds the sheath member 8 from all radial directions and limits the movable range of the sheath member 8.

The inner diameter of the vibration-resisting reinforcement portion 47 as measured on a cross section thereof taken perpendicular to the longitudinal direction is set to 2.6 mm, which is 0.1 mm greater than the outer diameter (2.5 mm) of the sheath member 8 as measured on a cross section thereof taken perpendicular to the longitudinal direction.

The outer diameter of the vibration-resisting reinforcement portion 47 as measured on the cross section thereof taken perpendicular to the longitudinal direction is 5.0 mm, which is greater than the maximum outer diameter (3.2 mm) of the joint portion 43 and smaller than the maximum outer diameter (15.0 mm) of the mounting seat 45.

The longitudinal length of the vibration-resisting reinforcement portion 47 (hereinafter also called the "reinforcement portion length L2") is set to 9.0 mm.

The maximum outer diameter of the mounting seat 45 means the diameter of a largest circle that circumscribes a maximum cross-sectional geometry of the mounting seat 45 taken perpendicular to the longitudinal direction, and in the present embodiment, corresponds to the diameter of the largest circle that circumscribes a cross-sectional geometry of the hexagonal nut portion 51 taken perpendicular to the longitudinal direction. The outer diameter of the joint portion 43 as measured at a crimp position is reduced to 3.0 mm as a result of deformation caused by crimping.

A tubular joint member 6 formed of metal is joined radially from an outside direction to the first stepped portion 44 of the rear-end sheath portion 42 of the mounting member 4. Specifically, the joint member 6 is press-fitted to the first stepped portion 44 of the rear-end sheath portion 42 such that an inner circumferential surface of the joint member 6 overlies an outer circumferential surface of the first stepped portion 44 of the rear-end sheath portion 42. Then, the joint member 6 and the first stepped portion 44 in a connected condition are subjected to circumferential laser welding. This laser welding forms a joint weld zone 61 penetrating the first stepped portion 44 of the rear-end sheath portion 42 and the joint member 6.

While accommodating therein the crimp terminals 11, the insulation tube 15 and an auxiliary ring 13, the joint member 6 is subjected, at its portion corresponding to the auxiliary ring 13, to radially inward round or polygonal crimping. In this manner, the joint member 6 is crimp-joined to the auxiliary ring 13 while maintaining gastightness.

An external circuit connected to the temperature sensor 1 via the lead wires 12 detects an electrical characteristic of the thermistor element 2 that changes with the temperature of a measurement object, and determines the temperature of the measurement gas on the basis of the detected electrical characteristic. In this manner, the temperature sensor 1 is connected to the external circuit and used for detecting the temperature.

As described above, since the temperature sensor 1 has a long tip end projection length L1 of 45 mm as measured between the mounting seat 45 and the tip end of the metal cap 14, the temperature sensor 1 can be used in an environment entailing a long distance between a sensor-mounting seat and a temperature detection position. Specifically, even when the temperature sensor 1 is applied to a flow pipe having a large diameter, the thermistor element 2 can be located at substantially the center position of the flow pipe, so that the temperature sensor 1 can favorably detect the temperature of a measurement gas at substantially the center position of the flow pipe.

Since the mounting member 4 of the temperature sensor 1 has a vibration-resisting reinforcement portion 47 between the mounting seat 45 and the joint portion 43, the mounting member 4 can surround a longitudinally long portion of the sheath member 8 in contrast with a conventional mounting member having no vibration-resisting reinforcement portion. Accordingly, as compared with a conventional mounting member, the mounting member 4 can more narrowly limit the movable range of the sheath member 8, so that the vibration characteristic of the sheath member 8 can be modified.

Since the vibration-resisting reinforcement portion 47 has an outer diameter greater than the maximum outer diameter of the joint portion 43, the vibration-resisting reinforcement portion 47 has a greater wall thickness than the joint portion 43 and thus has enhanced strength. Thus, the mounting member 4 having the vibration-resisting reinforcement portion 47 has an overall strength that is higher than that of a mounting member having no vibration-resisting reinforcement portion or a mounting member in which a joint portion is merely elongated in the longitudinal direction without employing a vibration-resisting reinforcement portion. Consequently the mounting member 4 can more firmly support the sheath member 8 against vibration.

Accordingly, the temperature sensor 1 can have a resonance frequency different from that of a temperature sensor whose mounting member does not have a vibration-resisting reinforcement portion. The resonance frequency of the temperature sensor 1 can be set within a frequency band different from a frequency band (e.g., 0 kHz to 1 kHz) of vibrations generated in a flow pipe to which the present embodiment is applied.

Since the vibration-resisting reinforcement portion 47 has an outer diameter smaller than the maximum outer diameter of the mounting seat 45, when the temperature sensor 1 is to be placed on a sensor-mounting seat of a flow pipe, the vibration-resisting reinforcement portion 47 does not interfere with the sensor-mounting seat. Accordingly, the temperature sensor 1 can be applied to applications similar to those employing a conventional temperature sensor having no vibration-resisting reinforcement portion.

Since the resonance frequency of the temperature sensor 1 can be set within a frequency band different from that of vibrations generated in an environment where the temperature sensor 1 is installed, even when the temperature sensor 1 is used in an environment entailing a long distance between a sensor-mounting seat and a temperature detection position in a flow pipe, the temperature sensor 1 can be free from wire or sheath member breakage caused by resonance.

In the temperature sensor 1, the inner diameter of the vibration-resisting reinforcement portion 47 is set to 2.6 mm, so that the difference between the inner diameter of the vibration-resisting reinforcement portion 47 and the outer diameter (2.5 mm) of the sheath member 8 is 0.1 mm.

Accordingly, the vibration-resisting reinforcement portion 47 can surround the sheath member 8 from all radial directions such that the clearance between the inner circumferential surface thereof and the outer circumferential surface of the sheath member 8 is 0.05 mm (corresponding to half of the diameter difference). As such, the movable range of a portion of the sheath member 8 surrounded by the vibration-resisting reinforcement portion 47 can be limited to within a certain range. In contrast with the case where the movable range is not limited, this enhances the vibration characteristic of the sheath member 8 and the vibration resistance of the temperature sensor.

A plurality of temperature sensors having a structure similar to that of the temperature sensor 1 and the vibration-resisting reinforcement portions 47 of different reinforcement portion lengths L2 were evaluated for durability against vibrations. The results of the evaluation are described below.

The evaluation was performed on each of the temperature sensors as follows. While the metal cap 14 (or more particularly, the thermistor element 2) was heated such that the temperature sensor 1 assumed a resistance corresponding to 850° C., vibration was applied to the temperature sensor 1. Endurance time (normal-operation time) during which the temperature sensor 1 could normally detect temperature was measured. Vibrations in a vibration frequency band of 0 Hz to 3,000 Hz were applied to the temperature sensor 1 while the vibration frequency was repeatedly varied at a rate of 1 Hz/sec between a lower limit of 0 Hz and an upper limit of 3,000 Hz. A vibrator was used to apply vibrations to the temperature sensor 1 at an acceleration of 20 G.

This evaluation measured a normal-operation time between the start of application of vibrations to the temperature sensor 1 and the occurrence of a break in the electrical path within the temperature sensor 1 or cracking or breakage of the sleeve of the sheath member 8. Sheath member breakage was visually confirmed. In order to detect the occurrence of a break in the electrical path within the temperature sensor 1, the thermistor element 2 and a fixed resistor (installed in the exterior of the temperature sensor 1) were connected in series so as to form a voltage-dividing circuit. A voltage of 5 V was applied to the voltage-dividing circuit. When 5 V was output from a voltage-dividing point, a break in the electrical path was judged to have occurred.

The temperature sensors thus evaluated were grouped into two types according to their tip end projection length L1; i.e., L1 was 20 mm or 45 mm. The temperature sensors belonging to each type of the tip end projection length L1 were further grouped into six types according to the reinforcement portion length L2 of the vibration-resisting reinforcement portion 47; i.e., L2 was set to 0%, 10%, 20%, 40%, 60%, or 70% of the tip end projection length. That is, twelve (12) types of temperature sensors were evaluated. The temperature sensors whose vibration-resisting reinforcement portions 47 had a reinforcement portion length L2 equal to 0% of the tip end projection length L1 are temperature sensors having only a joint portion but no vibration-resisting reinforcement portion, and were evaluated as Comparative Examples.

Durability of the respective temperature sensors to vibration was judged based on the results of the above evaluation as set forth in Table 1 below. In Table 1, the marks "o," "Δ," and "x" indicate a normal-operation time of 100 hours or more, 50 hours to less than 100 hours, and less than 50 hours, respectively.

TABLE 1

Results of Durability Evaluation

| Ratio (%) of L2 to L1 | Temperature Sensors with L1 = 20 mm | Temperature Sensors with L1 = 45 mm |
|---|---|---|
| 0 | x | X |
| 10 | Δ | Δ |
| 20 | ○ | ○ |
| 40 | ○ | ○ |
| 60 | ○ | ○ |
| 70 | ○ | ○ |

The above rated results show that those temperature sensors having a tip end projection length L1 of 20 mm and 45 mm and a reinforcement portion length L2 of the vibration-resisting reinforcement portion 47 of 20% or more the tip end projection length L1 were all judged "o", namely, as having a normal operation time of 100 hours or more. This indicates that these temperature sensors have high durability against vibrations and can properly detect temperature over a long period of use in a vibrating environment.

Those temperature sensors having a reinforcement portion length L2 of the vibration-resisting reinforcement portion 47 of 10% of the tip end projection length L1 were judged "Δ". This indicates that these temperature sensors failed to achieve a normal-operation time of 100 or more hours, yet have high durability against vibrations in contrast with a conventional temperature sensor having no vibration-resisting reinforcement portion (a temperature sensor whose reinforcement portion length L2 is 0% of the tip end projection length L1).

Therefore, the above results reveal that employing a reinforcement portion length L2 of the vibration-resisting reinforcement portion 47 equal to 20% or more the tip end projection length L1 can enhance the durability of a temperature sensor against vibrations and provide a temperature sensor having a long operating time in a vibrating environment.

When the distance between the thermistor element 2 and the mounting member 4 becomes short as a result of an increase in the reinforcement portion length L2 of the vibration-resisting reinforcement portion 47, the influence of temperature of the mounting member 4 on temperature detection by the thermistor element 2 increases. This can reduce the response speed of the thermistor element 2.

In order to prevent a reduction in response speed of temperature detection, the distance between the thermistor element 2 and the mounting member 4 is desirably set to a certain value or more, and the reinforcement portion length L2 of the vibration-resisting reinforcement portion 47 is set to 60% or less the tip end projection length L1.

By setting the reinforcement portion length L2 to 60% or less of the tip end projection length L1, a reduction in distance between the mounting member 4 and the thermistor element 2 can be avoided and thus an increase in thermal capacity of a portion of the temperature sensor located in the vicinity of the thermistor element 2 can be avoided. Accordingly, even when the temperature of a measurement gas changes abruptly, a change in temperature of the thermistor element 2 follows that of the measurement gas without long delay, thereby preventing impaired response of the temperature sensors.

The above embodiment (hereinafter referred to as "first embodiment") is described while referring to a temperature sensor having a metal cap that covers a tip end portion of the sheath member. However, the present invention is not limited thereto.

Next, a second temperature sensor according to a second embodiment of the present invention will be described. The second temperature sensor includes a metal tube that covers the entire portion of a sheath member located on the tip-end side with respect to a mounting member.

Figure 2:
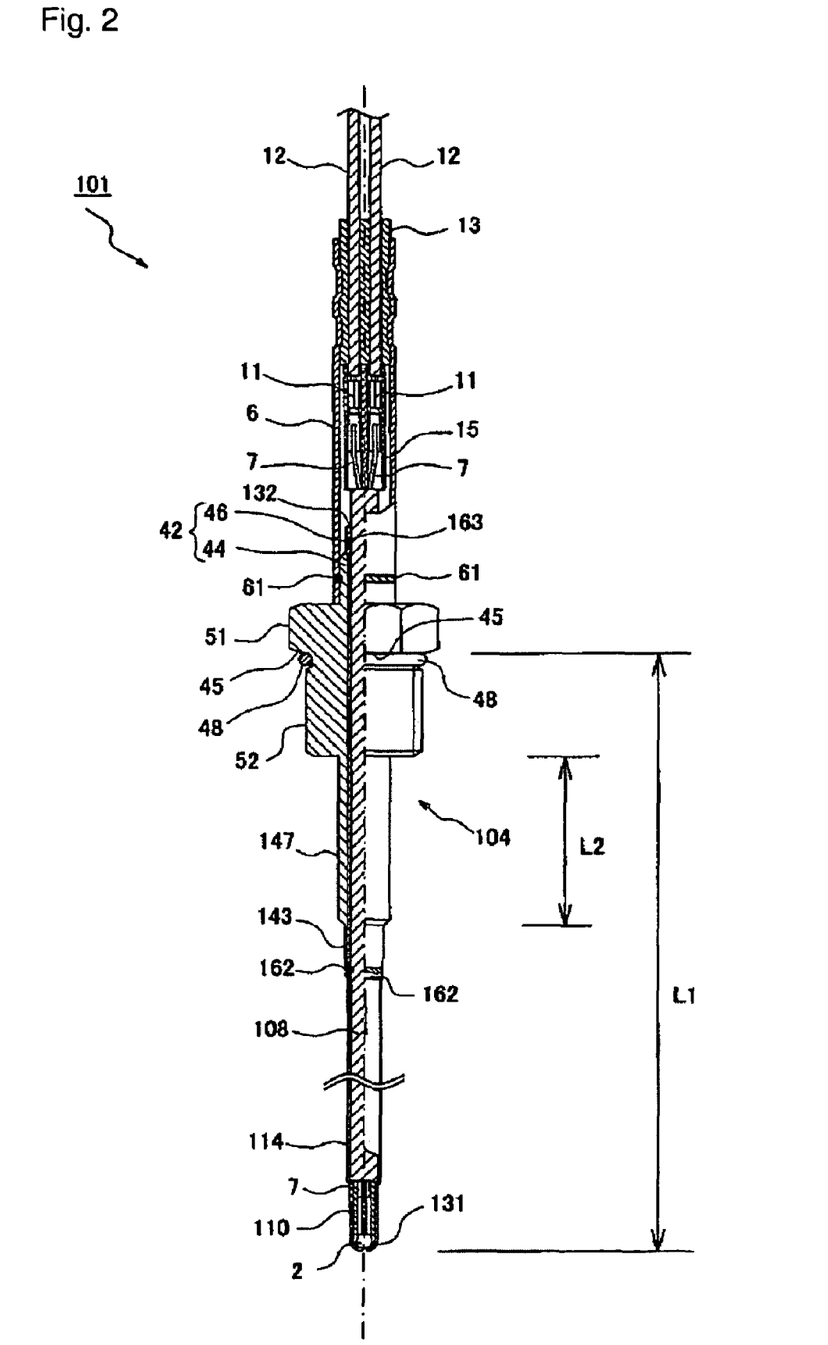
FIG. 2 is a fragmentary sectional view showing the structure of a temperature sensor which represents a second embodiment in accordance with the invention.

FIG. 2 is a fragmentary sectional view showing the structure of a second temperature sensor 101 having a metal tube.

The second temperature sensor 101 includes a second sheath member 108 insulating and holding a pair of metal core wires 7; a longitudinally extending metal tube 114 having a closed tip end; and a second mounting member 104 supporting the metal tube 114.

The second temperature sensor 101 has a thermistor element 2 serving as a temperature-sensitive element in the interior of the metal tube 114. The second temperature sensor 101 can be mounted, for example, to an intake pipe of an internal combustion engine, a hydrogen pipe of a fuel-cell vehicle, or a like flow pipe such that the thermistor element 2 is located in the flow pipe through which a measurement gas flows, so as to detect the temperature of the measurement gas. The thermistor element 2 varies in electrical characteristic (electric resistance) with temperature.

The paired metal core wires 7 are connected at their tip ends to corresponding electrode wires of the thermistor element 2 by resistance welding and are connected at their rear ends to corresponding crimp terminals 11 by resistance welding. The rear ends of the metal core wires 7 are connected via the crimp terminals 11 to corresponding lead wires 12 for connection to an external circuit (e.g., an electronic control unit (ECU) of a vehicle).

As in the case of the temperature sensor 1, the second temperature sensor 101 includes the insulation tube 15, the lead wires 12, the auxiliary ring 13, and the joint member 6. Component members of the second temperature sensor 101 which are similar to those of the temperature sensor 1 of the first embodiment are denoted by like reference numerals, and repeated description thereof is omitted.

Although unillustrated in detail, the second sheath member 108 is configurationally similar to the sheath member 8 of the first embodiment in that both include a sleeve, a pair of metal core wires 7, and an insulating powder, but differ in that the outer diameter thereof is greater than that of the sheath member 8 of the first embodiment.

The metal tube 114 is formed of a sheet of a corrosion-resistant metal (e.g., stainless steel alloy such as SUS316) by deep drawing and assumes a longitudinally extending tubular form in which a tube tip-end portion 131 is closed, whereas a tube rear-end portion 132 is open. The longitudinal length of the metal tube 114 is set such that the thermistor element 2 and a tip end portion of the second sheath member 108 are accommodated in the tube tip-end portion 131, and such that the tube rear-end portion 132 contacts the inner circumferential surface of the second stepped portion 46 of the second mounting member 104.

The metal tube 114 contains the thermistor element 2 and cement 110. The cement 110 is charged around the thermistor element 2 and prevents vibratory movement of the thermistor element 2.

The second mounting member 104 includes a hexagonal nut portion 51 projecting radially outward; a threaded portion 52; and a rear-end sheath portion 42 extending longitudinally rearward from the rear end of the hexagonal nut portion 51. The second mounting member 104 further includes a mounting seat 45 which is formed as the front end surface of the hexagonal nut portion 51; a second joint portion 143 joined to a portion of the metal tube 114 located on the tip-end side with respect to the mounting seat 45; and a second vibration-resisting reinforcement portion 147 surrounding from all radial directions a portion of the metal tube 114 located between the mounting seat 45 and the second joint portion 143.

A through hole extending longitudinally through the second mounting member 104 has a diameter greater than that of the through hole of the mounting member 4 of the first embodiment. Thus the second mounting member 104 permits insertion therethrough of the metal tube 114 whose outer diameter is greater than that of the sheath member 8 of the first embodiment.

The second mounting member 104 supports the metal tube 114 while surrounding an outer circumferential surface of a rear portion of the metal tube 114 with at least a tip end portion of the metal tube 114 exposed to the exterior thereof.

The second mounting member 104 is fixed to a sensor-mounting seat formed on a flow pipe or the like while the annular seal ring 48 formed of an elastic material (e.g., heat-resistant rubber) lies on the tip-end side of the mounting seat 45.

The second mounting member 104 is fixed to the sensor-mounting seat by engaging the threaded portion 52 with a threaded hole formed in the sensor-mounting seat. The position of the second mounting member 104 at the sensor-mounting position with respect to the insertion direction is determined by means of the mounting seat 45 which comes into indirect contact with the sensor-mounting seat (sensor-mounting surface) via the seal ring 48.

The second joint portion 143 assumes an annular form to permit insertion of the metal tube 114 therethrough and is joined to the metal tube 114 while surrounding the metal tube 114 from all radial directions. The second joint portion 143 has a thin wall thickness (difference between the outer diameter and the inner diameter) so as to be deformable when crimped.

The rear-end sheath portion 42 assumes a two-stepped annular form consisting of the first stepped portion 44 and the second stepped portion 46 located rearward of the first stepped portion 44 and having an outer diameter smaller than that of the first stepped portion 44. The second stepped portion 46 has a thin wall thickness (difference between the outer diameter and the inner diameter) so as to be deformable when crimped.

After the metal tube 114 is inserted through the second mounting member 104, the second mounting member 104 is subjected to radially inward crimping and electron beam welding at the second joint portion 143 and the second stepped portion 46, thereby supporting the metal tube 114 while surrounding an outer circumferential surface of the metal tube 114. That is, the metal tube 114 is fixed to the second mounting member 104 by virtue of being joined to the second joint portion 143 and to the second stepped portion 46.

The welding work causes formation of a second tip-end side weld zone 162 penetrating the second joint portion 143 and the metal tube 114, and a second rear-end side weld zone (supporting portion) 163 penetrating the second stepped portion 46 and the metal tube 114.

In the second temperature sensor 101, the relative position between the second mounting member 104 and the metal tube 114 is set such that at least a tip-end portion of the metal tube 114 is exposed to the exterior of the second mounting member 104 and such that the tip end projection length L1 as measured longitudinally between the mounting seat 45 of the second mounting member 104 and the tip end of the metal tube 114 becomes 45 mm.

The second temperature sensor 101 employs the metal tube 114, the second mounting member 104, and the joint member 6 collectively as a metal enclosure member, and the thermistor element 2 is accommodated in a closed space defined by the metal enclosure member. In the second temperature sensor 101, when air enters from the exterior thereof into the interior of the joint member 6 via internal spaces of the lead wires 12, the air further enters into the interior of the metal tube 114 since the joint member 6, the metal tube 114, and the second mounting member 104 define a closed space therein.

Accordingly, ventilation is established in the interior of the lead wires 12 and the interior of the metal tube 114. Even when the metal tube 114 which contains the thermistor element 2 is oxidized, a reduction in oxygen concentration in the interior of the metal tube 114 is suppressed, so that variation in the characteristics of the thermistor element 2 can be suppressed.

The second vibration-resisting reinforcement portion 147 assumes an annular form to permit insertion of the metal tube 114 therethrough. With the metal tube 114 being fixed to the second mounting member 104, the second vibration-resisting reinforcement portion 147 surrounds the metal tube 114 from all radial directions and limits the movable range of the metal tube 114.

The inner diameter of the second vibration-resisting reinforcement portion 147 as measured on a cross section thereof taken perpendicular to the longitudinal direction is set to 3.4 mm, which is 0.1 mm greater than the outer diameter (3.3 mm) of the metal tube 114 as measured on a cross section thereof taken perpendicular to the longitudinal direction.

The outer diameter of the second vibration-resisting reinforcement portion 147 as measured on a cross section thereof taken perpendicular to the longitudinal direction is 6.0 mm, which is greater than the maximum outer diameter (4.0 mm) of the second joint portion 143 and smaller than the maximum outer diameter (15.0 mm) of the mounting seat 45.

The longitudinal length of the second vibration-resisting reinforcement portion 147 (hereinafter also called the "reinforcement portion length L2") is set to 9.0 mm.

In the present embodiment, the maximum outer diameter of the mounting seat 45 corresponds to the maximum outer diameter of the hexagonal nut portion 51. The outer diameter of the second joint portion 143 as measured at a crimp position is reduced to 3.8 mm as a result of deformation caused by crimping work.

An external circuit connected to the second temperature sensor 101 via the lead wires 12 detects an electrical characteristic of the thermistor element 2 that changes with the temperature of a measurement object, and determines the temperature of the measurement gas on the basis of the detected electrical characteristic. In this manner, the second temperature sensor 101 is connected to the external circuit and used for detecting temperature.

As described above, as in the case of the temperature sensor 1 of the first embodiment, since the second temperature sensor 101 has a long tip end projection length L1, the second temperature sensor 101 can be used in an environment entailing a long distance between a sensor-mounting seat and a temperature detection position, so that the second temperature sensor 101 can detect the temperature of a measurement gas at substantially the center position of a flow pipe.

Since the second mounting member 104 of the second temperature sensor 101 has the second vibration-resisting reinforcement portion 147 between the mounting seat 45 and the second joint portion 143, the second mounting member 104 can surround a longitudinally long portion of the metal tube 114 in contrast with a conventional mounting member having no vibration-resisting reinforcement portion. Accordingly, as compared with a conventional mounting member, the second mounting member 104 can more narrowly limit the movable range of the metal tube 114, so that the vibration characteristic of the metal tube 114 can be modified.

Since the second vibration-resisting reinforcement portion 147 has an outer diameter greater than the maximum outer diameter of the second joint portion 143, the second vibration-resisting reinforcement portion 147 has a greater wall thickness than the second joint portion 143 and thus has enhanced strength. Thus, the second mounting member 104 having the second vibration-resisting reinforcement portion 147 has an overall strength higher than that of a mounting member having no vibration-resisting reinforcement portion or a mounting member in which a joint portion is merely elongated in the longitudinal direction without employing a vibration-resisting reinforcement portion. As such the second mounting member 104 can more firmly support the metal tube 114 against vibration.

Accordingly, The second temperature sensor 101 can have a resonance frequency different from that of a temperature sensor whose mounting member does not have a vibration-resisting reinforcement portion. The resonance frequency of the second temperature sensor 101 can be set within a frequency band different from a frequency band (e.g., 0 kHz to 1 kHz) of vibrations generated in a flow pipe to which the present embodiment is applied.

Since the second vibration-resisting reinforcement portion 147 has an outer diameter smaller than the maximum outer diameter of the mounting seat 45, when the second temperature sensor 101 is to be placed on a sensor-mounting seat of a flow pipe, the second vibration-resisting reinforcement portion 147 does not interfere with the sensor-mounting seat. Accordingly, the second temperature sensor 101 can be applied to applications similar to those employing a conventional temperature sensor having no vibration-resisting reinforcement portion.

Since the resonance frequency of the second temperature sensor 101 can be set within a frequency band different from that of vibrations generated in an environment where the second temperature sensor 101 is installed, even when the second temperature sensor 101 is used in an environment entailing a long distance between a sensor-mounting seat and a temperature detection position in a flow pipe, the second temperature sensor 101 can be free from wire or metal tube breakage caused by resonance.

The second temperature sensor 101 is fabricated such that the difference between the inner diameter of the second vibration-resisting reinforcement portion 147 and the outer diameter of the metal tube 114 is 0.1 mm.

Accordingly, the second vibration-resisting reinforcement portion 147 can surround the metal tube 114 from all radial directions such that the clearance between the inner circumferential surface thereof and the outer circumferential surface of the metal tube 114 is 0.05 mm (corresponding to half of the diameter difference). As such, the movable range of a portion of the metal tube 114 surrounded by the second vibration-resisting reinforcement portion 147 can be limited to a certain range. In contrast with the case where the movable range is not limited, this enhances the vibration characteristic of the metal tube 114 and the vibration resistance of the temperature sensor.

Accordingly, the second temperature sensor 101 can have a resonance frequency different from that of a temperature sensor which does not have the second vibration-resisting reinforcement portion 147, and thus can be free from wire or metal tube breakage caused by resonance.

Also, as in the case of the temperature sensor 1 of the first embodiment, by setting the reinforcement portion length L2 of the second vibration-resisting reinforcement portion 147 to 20% or more of the tip end projection length L1, the second temperature sensor 101 can have enhanced durability against vibrations and provide a long operating time in a vibrating environment.

Further, as in the case of the temperature sensor 1 of the first embodiment, by setting the reinforcement portion length L2 to 60% or less of the tip end projection length L1, a reduction in distance between the second mounting member 104 and the thermistor element 2 can be avoided in the second temperature sensor 101. In the thus-configured second temperature sensor 101, a change in temperature of the thermistor element 2 follows that of a measurement gas without long delay, thereby preventing impaired response associated with temperature detection.

Figure 3:
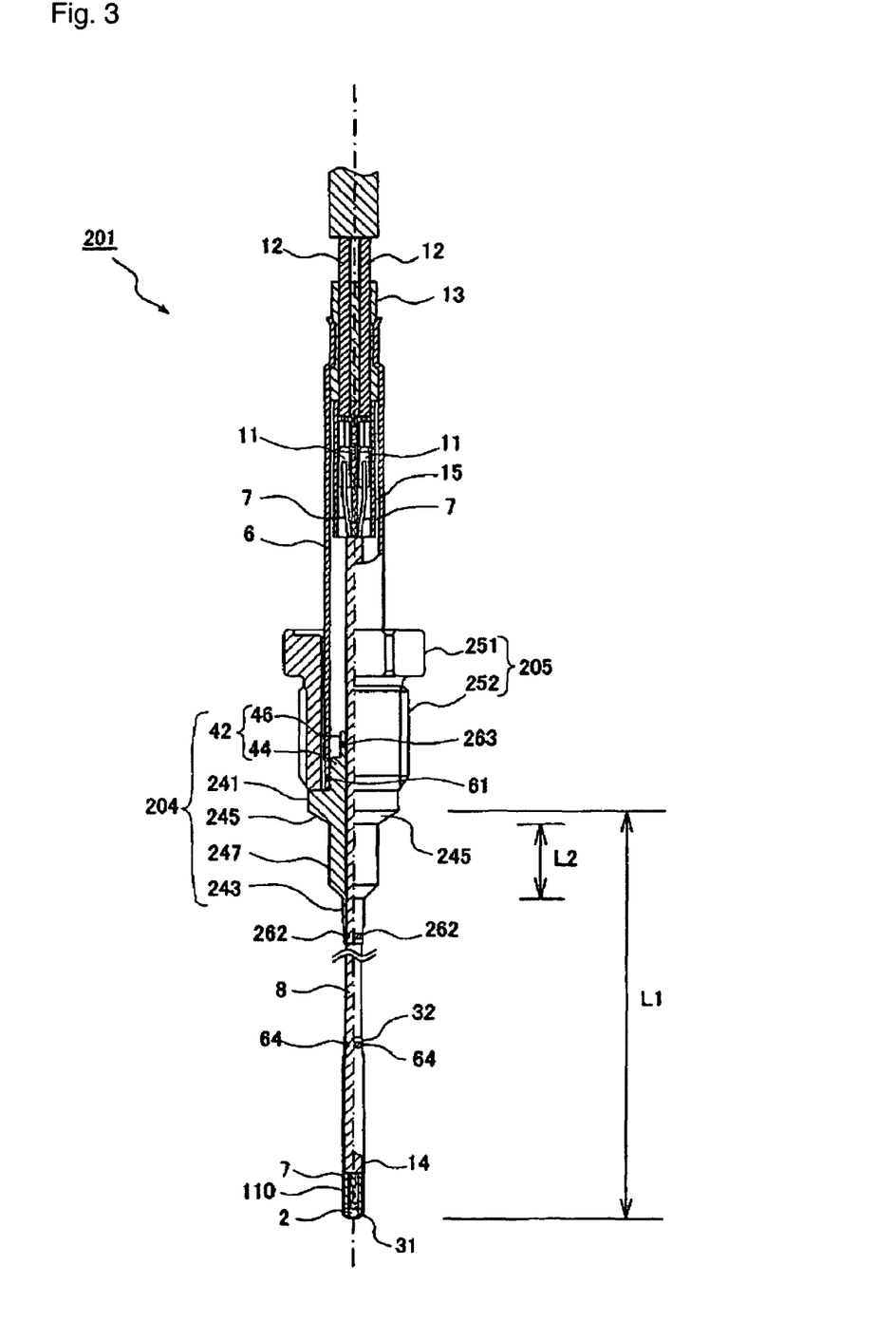
FIG. 3 is a fragmentary sectional view showing the structure of a temperature sensor which represents a third embodiment in accordance with the invention.

Next, a third temperature sensor 201 according to a third embodiment of the present invention will be described. In the third temperature sensor 201, the mounting member does not have a threaded portion and a hexagonal nut portion, and a member having the threaded portion and the hexagonal nut portion is provided separately from the mounting member.

FIG. 3 is a fragmentary sectional view showing the structure of the third temperature sensor 201.

The third temperature sensor 201 includes sheath member 8 insulating and holding the pair of metal core wires 7; a longitudinally extending tubular metal cap 14 having a closed tip end; and a third mounting member 204 supporting the sheath member 8. The third temperature sensor 201 further includes a nut member 205 having a hexagonal nut portion 251 and a threaded portion 252.

The metal core wires 7, the sheath member 8, the joint member 6, the lead wires 12, among others of the third temperature sensor 201 are similar to those of the first embodiment. Like component members of the first and third embodiments are denoted by like reference numerals, and repeated description thereof is omitted.

The third temperature sensor 201 has a thermistor element 2 serving as a temperature-sensitive element in the interior of the metal cap 14. The third temperature sensor 201 can be mounted, for example, to an exhaust pipe of an internal combustion engine such that the thermistor element 2 is located in the exhaust pipe through which an exhaust gas flows, and can be used to detect the temperature of the exhaust gas.

In contrast to the first embodiment in which the vibration-insulating material 17 is contained in the metal cap 14, the third temperature sensor 201 contains in the metal cap 14 cement 110 similar to that used in the second embodiment. Since the metal cap 14 is used in a high-temperature environment whose temperature reaches 1,000° C., the metal cap 14 is formed of SUS310S or a like heat-resistant metal while assuming a form similar to that of the first embodiment.

The third mounting member 204 includes a projection 241 projecting radially outward; a third vibration-resisting reinforcement portion 247 located on the tip-end side of the projection 241 and extending longitudinally; a third joint portion 243 located on the tip-end side of the third vibration-resisting reinforcement portion 247 and extending longitudinally; and a rear-end sheath portion 42 located on the rear-end side of the projection 241 and extending longitudinally.

The third mounting member 204 supports the sheath member 8 while surrounding an outer circumferential surface of the sheath member 8 with at least the metal cap 14 and a tip end portion of the sheath member 8 exposed to the exterior thereof.

The projection 241 is annularly formed and has a third mounting seat 245 formed on the tip-end side thereof. The third mounting seat 245 is tapered such that its diameter is reduced toward the tip end of the projection 241. The third mounting seat 245 is tapered in corresponding relation with a taper portion of a sensor-mounting seat of an unillustrated exhaust pipe. The taper portion of the sensor-mounting seat is tapered such that its diameter increases rearward.

When the third mounting member 204 is placed on the sensor-mounting seat of the exhaust pipe, the third mounting seat 245 comes into direct, close contact with the taper portion of the sensor-mounting seat, thereby preventing leakage of exhaust gas to the exterior of the exhaust pipe.

The third joint portion 243 assumes an annular form to permit insertion of the sheath member 8 therethrough and is joined to the sheath member 8 while surrounding the sheath member 8 from all radial directions. The third joint portion 243 has a thin wall thickness (difference between the outer diameter and the inner diameter) so as to be deformable when crimped.

The rear-end sheath portion 42 assumes a two-stepped annular form consisting of the first stepped portion 44 and the second stepped portion 46 located rearward of the first stepped portion 44 and having an outer diameter smaller than that of the first stepped portion 44. The second stepped portion 46 has a thin wall thickness (difference between the outer diameter and the inner diameter) so as to be deformable when crimped.

After the sheath member 8 is inserted through the third mounting member 204, the third mounting member 204 is subjected to radially inward crimping and electron beam welding at the third joint portion 243 and the second stepped portion 46, thereby supporting the sheath member 8 while surrounding an outer circumferential surface of the sheath member 8. That is, the sheath member 8 is fixed to the third mounting member 204 by virtue of being joined to the third joint portion 243 and to the second stepped portion 46.

The welding work causes formation of a third tip-end side weld zone 262 penetrating the third joint portion 243 and the sheath member 8 (more specifically, the sleeve of the sheath member 8), and a third rear-end side weld zone 263 penetrating the second stepped portion 46 and the sheath member 8 (more specifically, the sleeve of the sheath member 8).

The relative position between the third mounting member 204 and the sheath member 8 is set such that at least the metal cap 14 is exposed to the exterior of the third mounting member 204 and such that the tip end projection length L1 as measured longitudinally between the rear end of the third mounting seat 245 of the third mounting member 204 and the tip end of the metal cap 14 becomes 45 mm.

The third vibration-resisting reinforcement portion 247 assumes an annular form to permit insertion of the sheath member 8 therethrough. With the sheath member 8 being fixed to the third mounting member 204, the vibration-resisting reinforcement portion 247 surrounds the sheath member 8 from all radial directions and limits the movable range of the sheath member 8.

The inner diameter of the third vibration-resisting reinforcement portion 247 as measured on a cross section thereof taken perpendicular to the longitudinal direction is set to 2.6 mm, which is 0.1 mm greater than the outer diameter (2.5 mm) of the sheath member 8 as measured on a cross section thereof taken perpendicular to the longitudinal direction.

The outer diameter of the third vibration-resisting reinforcement portion 247 as measured on a cross section thereof taken perpendicular to the longitudinal direction is 5.4 mm, which is greater than the maximum outer diameter (3.4 mm) of the third joint portion 243 and smaller than the maximum outer diameter (10.0 mm) of the third mounting seat 245.

The longitudinal length of the third vibration-resisting reinforcement portion 247 (hereinafter also called the "reinforcement portion length L2") is set to 9.0 mm.

The maximum outer diameter of the third mounting seat 245 means the diameter of the largest circle that circumscribes a maximum cross-sectional geometry of the third mounting seat 245 taken perpendicular to the longitudinal direction. In the present embodiment, this corresponds to the diameter of a largest circle that circumscribes a cross-sectional geometry of the third mounting seat 245 taken, at the rear end of its taper surface, perpendicular to the longitudinal direction. The outer diameter of the third joint portion 243 as measured at a crimp position is reduced to 3.2 mm as a result of deformation caused by crimping.

The tubular joint member 6 formed of a stainless steel alloy is joined radially from an outside direction to the first stepped portion 44 of the rear-end sheath portion 42 of the third mounting member 204. Specifically, the joint member 6 is press-fitted to the first stepped portion 44 of the rear-end sheath portion 42 such that an inner circumferential surface of the joint member 6 overlies an outer circumferential surface of the first stepped portion 44 of the rear-end sheath portion 42. Then, the joint member 6 and the first stepped portion 44 in a connected condition are subjected to circumferential laser welding. This laser welding forms a joint weld zone 61 penetrating the first stepped portion 44 of the rear-end sheath portion 42 and the joint member 6.

While accommodating therein the crimp terminals 11, the insulation tube 15 and the auxiliary ring 13, the joint member 6 is subjected, at a portion corresponding to the auxiliary ring 13, to radially inward round or polygonal crimping. In this manner, the joint member 6 is crimp-joined to the auxiliary ring 13 while maintaining gastightness.

While the nut member 205 is rotatably fitted to the joint member 6, the third mounting member 204 is placed on a sensor-mounting seat such that the third mounting seat 245 abuts the taper surface of the sensor-mounting seat. Subsequently, the third mounting member 204 is fixed to the sensor-mounting seat by engaging the threaded portion 252 of the nut member 205 with a threaded hole formed in the sensor-mounting seat. In other words, the third mounting member 204 is fixed in place while being held between the nut member 205 and the taper surface of the sensor-mounting seat. The position of the third mounting member 204 at the sensor-mounting seat with respect to the insertion direction is determined by means of the third mounting seat 245 which comes into contact with the taper surface of the sensor-mounting seat.

An external circuit connected to the third temperature sensor 201 via the lead wires 12 detects an electrical characteristic of the thermistor element 2 that changes with the temperature of a measurement object, and determines the temperature of the exhaust gas on the basis of the detected electrical characteristic. In this manner, the third temperature sensor 201 is connected to the external circuit and used for detecting temperature.

As described above, as in the case of the temperature sensor 1 of the first embodiment, since the third temperature sensor 201 has a long tip end projection length L1, the third temperature sensor 201 can be used in an environment entailing a long distance between a sensor-mounting seat and a temperature detection position.

Since the third mounting member 204 of the third temperature sensor 201 has the third vibration-resisting reinforcement portion 247, the third mounting member 204 can surround a longitudinally long portion of the sheath member 8 in contrast with a conventional mounting member having no vibration-resisting reinforcement portion. Accordingly, as compared with a conventional mounting member, the third mounting member 204 can more narrowly limit the movable range of the sheath member 8, so that the vibration characteristic of the sheath member 8 can be modified.

Since the third vibration-resisting reinforcement portion 247 has an outer diameter greater than the maximum outer diameter of the third joint portion 243, the third vibration-resisting reinforcement portion 247 has a greater wall thickness than the third joint portion 243 and thus has enhanced strength. Thus, the third mounting member 204 having the third vibration-resisting reinforcement portion 247 has an overall strength higher than that of a mounting member having no vibration-resisting reinforcement portion or a mounting member in which a joint portion is merely elongated in the longitudinal direction without employing a vibration-resisting reinforcement portion. As such the third mounting member 204 can more firmly support the sheath member 8 against vibration.

Since the resonance frequency of the third temperature sensor 201 can be set within a frequency band different from that of vibrations generated in an environment where the third temperature sensor 201 is installed, even when the third temperature sensor 201 is used in an environment entailing a long distance between a sensor-mounting seat and a temperature detection position in an exhaust pipe, the third temperature sensor 201 can be free from wire or sheath member breakage caused by resonance.

Figure 4:
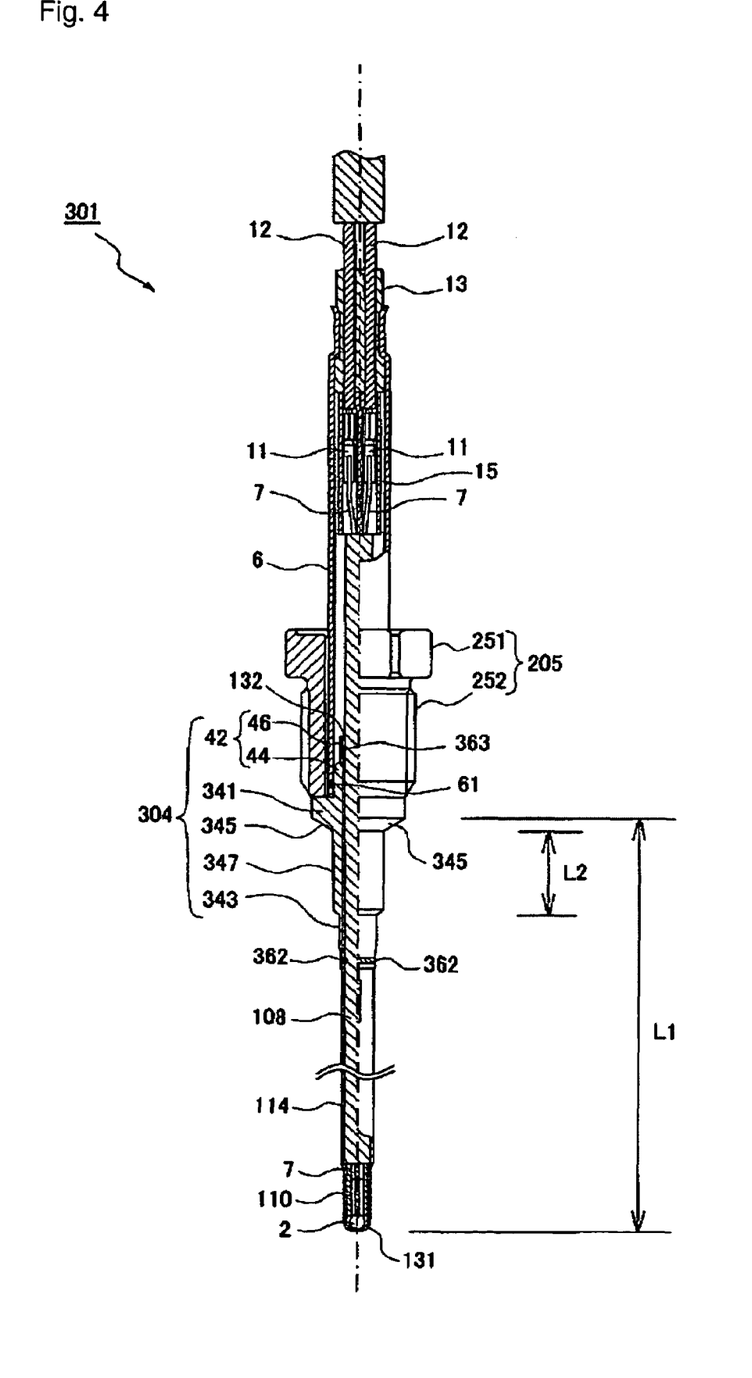
FIG. 4 is a fragmentary sectional view showing the structure of a temperature sensor which represents a fourth embodiment in accordance with the invention.

Next, a fourth temperature sensor 301 according to a fourth embodiment of the present invention will be described. The fourth temperature sensor 301 has a metal tube, and a member having a threaded portion and a hexagonal nut portion provided separately from a mounting member.

FIG. 4 is a fragmentary sectional view showing the structure of the fourth temperature sensor 301.

The fourth temperature sensor 301 includes second sheath member 108 insulating and holding a pair of metal core wires 7; a longitudinally extending metal tube 114 having a closed tip end; and a fourth mounting member 304 supporting the metal tube 114. The fourth temperature sensor 301 further includes nut member 205 having a hexagonal nut portion 251 and a threaded portion 252.

Component members of the fourth temperature sensor 301 which are similar to those of the first to third embodiments are denoted by like reference numerals, and repeated description thereof is omitted.

The fourth temperature sensor 301 has a thermistor element 2 serving as a temperature-sensitive element in the interior of the metal tube 114. The fourth temperature sensor 301 can be mounted, for example, to an exhaust pipe of an internal combustion engine such that the thermistor element 2 is located in the exhaust pipe through which an exhaust gas flows, and can be used to detect the temperature of the exhaust gas.

The fourth temperature sensor 301 includes crimp terminals 11, insulation tube 15, lead wires 12, auxiliary ring 13, and joint member 6. Since these component members are already described with respect to the preceding embodiments, repeated description thereof is omitted.

The fourth mounting member 304 includes a fourth projection 341 projecting radially outward; a fourth vibration-resisting reinforcement portion 347 located on the tip-end side of the fourth projection 341 and extending longitudinally; a fourth joint portion 343 located on the tip-end side of the fourth vibration-resisting reinforcement portion 347 and extending longitudinally; and a rear-end sheath portion 42 located on the rear-end side of the fourth projection 341 and extending longitudinally.

A through hole extending longitudinally through the fourth mounting member 304 has a diameter greater than that of the through hole of the third mounting member 204 of the third embodiment. In this manner the fourth mounting member 304 permits insertion of metal tube 114 therethrough whose outer diameter is greater than that of the sheath member 8 of the third embodiment.

The fourth mounting member 304 supports the metal tube 114 while surrounding an outer circumferential surface of a rear portion of the metal tube 114 with at least a tip end portion of the metal tube 114 exposed to the exterior thereof.

Since the metal tube 114 of the fourth temperature sensor 301 is used in a high-temperature environment whose temperature reaches 1,000° C., the metal tube 114 is formed of SUS310S or a like heat-resistant metal while assuming a form similar to that in the second embodiment.

The fourth projection 341 is annularly formed and has a fourth mounting seat 345 formed on the tip-end side thereof. The fourth mounting seat 345 is tapered such that its diameter is reduced toward the tip end of the fourth projection 341. The fourth mounting seat 345 is tapered in corresponding relation with a taper portion of a sensor-mounting seat of an unillustrated exhaust pipe. The taper portion is tapered such that its diameter increases rearward.

When the fourth mounting member 304 is placed on the sensor-mounting seat of the exhaust pipe, the fourth mounting seat 345 comes into direct, close contact with the taper portion of the sensor-mounting seat, thereby preventing leakage of exhaust gas to the exterior of the exhaust pipe.

The fourth joint portion 343 assumes an annular form to permit insertion of the metal tube 114 therethrough and is joined to the metal tube 114 while surrounding the metal tube 114 from all radial directions. The fourth joint portion 343 has a thin wall thickness (difference between the outer diameter and the inner diameter) so as to be deformable when crimped.

The rear-end sheath portion 42 assumes a two-stepped annular form consisting of the first stepped portion 44 and the second stepped portion 46 located rearward of the first stepped portion 44 and having an outer diameter smaller than that of the first stepped portion 44. The second stepped portion 46 has a thin wall thickness (difference between the outer diameter and the inner diameter) so as to be deformable when crimped.

After the metal tube 114 is inserted through the fourth mounting member 304, the fourth mounting member 304 is subjected to radially inward crimping and electron beam welding at the fourth joint portion 343 and the second stepped portion 46, thereby supporting the metal tube 114 while surrounding an outer circumferential surface of the metal tube 114. That is, the metal tube 114 is fixed to the fourth mounting member 304 by virtue of being joined to the fourth joint portion 343 and to the second stepped portion 46.

The welding work forms a fourth tip-end side weld zone 362 penetrating the fourth joint portion 343 and the metal tube 114, and a fourth rear-end side weld zone 363 penetrating the second stepped portion 46 and the metal tube 114.

The relative position between the fourth mounting member 304 and the metal tube 114 is set such that at least a tip-end portion of the metal tube 114 is exposed to the exterior of the fourth mounting member 304 and such that the tip end projection length L1 as measured longitudinally between the rear end of the fourth mounting seat 345 of the fourth mounting member 304 and the tip end of the metal tube 114 becomes 45 mm.

The fourth vibration-resisting reinforcement portion 347 assumes an annular form to permit insertion of the metal tube 114 therethrough. With the metal tube 114 being fixed to the fourth mounting member 304, the fourth vibration-resisting reinforcement portion 347 surrounds the metal tube 114 from all radial directions and limits the movable range of the metal tube 114.

The inner diameter of the fourth vibration-resisting reinforcement portion 347 as measured on a cross section thereof taken perpendicular to the longitudinal direction is set to 3.4 mm, which is 0.1 mm greater than the outer diameter (3.3 mm) of the metal tube 114 as measured on a cross section thereof taken perpendicular to the longitudinal direction.

The outer diameter of the fourth vibration-resisting reinforcement portion 347 as measured on the cross section thereof taken perpendicular to the longitudinal direction is 6.0 mm, which is greater than the maximum outer diameter (4.0 mm) of the fourth joint portion 343 and smaller than the maximum outer diameter (10.0 mm) of the fourth mounting seat 345.

The longitudinal length of the fourth vibration-resisting reinforcement portion 347 (hereinafter also called the "reinforcement portion length L2") is set to 9.0 mm.

The maximum outer diameter of the fourth mounting seat 345 means the diameter of a largest circle that circumscribes a maximum cross-sectional geometry of the fourth mounting seat 345 taken perpendicular to the longitudinal direction. In the present embodiment, this corresponds to the diameter of a largest circle that circumscribes a cross-sectional geometry of the fourth mounting seat 345 taken, at the rear end of its taper surface, perpendicular to the longitudinal direction. The outer diameter of the fourth joint portion 343 as measured at a crimp position is reduced to 3.8 mm as a result of deformation caused by crimping.

The tubular joint member 6 formed of a stainless steel alloy is joined from radially outside to the first stepped portion 44 of the rear-end sheath portion 42 of the fourth mounting member 304. The fourth mounting member 304 and the joint member 6 are joined together in a manner similar to that of the third embodiment, and repeated description thereof is omitted.

While the nut member 205 is rotatably fitted to the joint member 6, the fourth mounting member 304 is placed on a sensor-mounting seat such that the fourth mounting seat 345 abuts the taper surface of the sensor-mounting seat. Subsequently, the fourth mounting member 304 is fixed to the sensor-mounting seat by engaging the threaded portion 252 of the nut member 205 with a threaded hole formed in the sensor-mounting seat. That is, the fourth mounting member 304 is fixed in place while being held between the nut member 205 and the taper surface of the sensor-mounting seat. The position of the fourth mounting member 304 at the sensor-mounting seat with respect to the insertion direction is determined by means of the fourth mounting seat 345 which comes into contact with the taper surface of the sensor-mounting seat.

An external circuit connected to the fourth temperature sensor 301 via the lead wires 12 detects an electrical characteristic of the thermistor element 2 that changes with the temperature of a measurement object, and determines the temperature of the exhaust gas on the basis of the detected electrical characteristic. In this manner, the fourth temperature sensor 301 is connected to the external circuit and used for detecting temperature.

As described above, as in the case of the temperature sensor 1 of the first embodiment, since the fourth temperature sensor 301 has a long tip end projection length L1, the fourth temperature sensor 301 can be used in an environment entailing a long distance between a sensor-mounting seat and a temperature detection position.

Since the fourth mounting member 304 of the fourth temperature sensor 301 has the fourth vibration-resisting reinforcement portion 347, the fourth mounting member 304 can surround a longitudinally long portion of the metal tube 114 in contrast with a conventional mounting member having no vibration-resisting reinforcement portion. Accordingly, as compared with a conventional mounting member, the fourth mounting member 304 can more narrowly limit the movable range of the metal tube 114, so that the vibration characteristic of the metal tube 114 can be modified.

Since the fourth vibration-resisting reinforcement portion 347 has an outer diameter greater than the maximum outer diameter of the fourth joint portion 343, the fourth vibration-resisting reinforcement portion 347 has a greater wall thickness than the fourth joint portion 343 and thus has enhanced strength. Thus, the fourth mounting member 304 having the fourth vibration-resisting reinforcement portion 347 has an overall strength higher than that of a mounting member having no vibration-resisting reinforcement portion or a mounting member in which a joint portion is merely elongated in the longitudinal direction without employing a vibration-resisting reinforcement portion. As such, the fourth mounting member 304 can more firmly support the metal tube 114 against vibration.

Since the resonance frequency of the fourth temperature sensor 301 can be set within a frequency band different from that of vibrations generated in an environment where the fourth temperature sensor 301 is installed, even when the fourth temperature sensor 301 is used in an environment entailing a long distance between a sensor-mounting seat and a temperature detection position in an exhaust pipe, the fourth temperature sensor 301 can be free from wire or metal tube breakage caused by resonance.

While the present invention has been described with reference to the above preferred embodiments, the present invention is not limited thereto. The present invention may be embodied in various other forms without departing from the spirit and scope of the invention.

For example, the difference between the inner diameter of the vibration-resisting reinforcement portion and the outer diameter of the sheath member (or the metal tube) is not limited to 0.1 mm, but may be set to 0.3 mm or less. This can limit the movable range of the sheath member (or the metal tube), so that the resonance frequency of the temperature sensor can be modified.

The difference between the inner diameter of the vibration-resisting reinforcement portion and the outer diameter of the sheath member (or the metal tube) can be set to 0 mm so as to bring the inner circumferential surface of the vibration-resisting reinforcement portion into contact with the outer circumferential surface of the sheath member (or the metal tube). As such, the vibration-resisting reinforcement portion can limit movement of the sheath member (or the metal tube) and can support the sheath member (or the metal tube).

Next, the tip end projection dimension L1 is not limited to 45 mm, but may be set in accordance with an environment where the temperature sensor is installed (that is, in accordance with the distance between a sensor-mounting seat and a temperature detection position). Application of the present invention to a temperature sensor used in an environment where there is a distance of 20 mm or more between the sensor-mounting seat and the temperature detection position allows the temperature sensor to be free from wire or sheath member (or the metal tube) breakage caused by resonance.

The type of crimping work may be round crimping or polygonal crimping, such as hexagonal crimping or octagonal crimping. The type of crimping work is not particularly limited so long as the subject two members are united together.

In the case of a mounting member having a tapered mounting seat, the taper angle of the mounting seat is not necessarily equal to the taper angle of a taper portion of a sensor-mounting seat.

Figure 5:
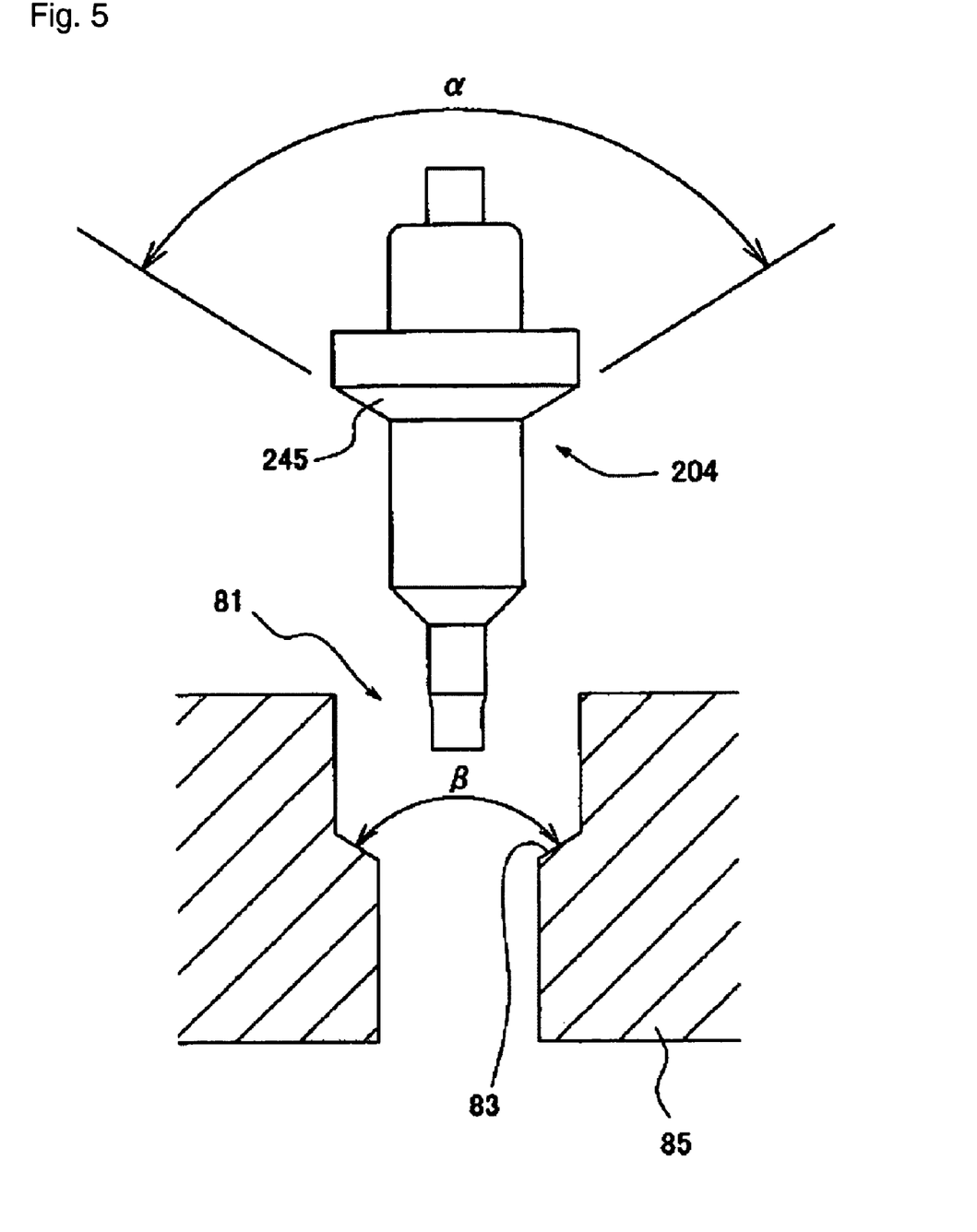
FIG. 5 is an explanatory view showing taper angle α of a mounting seat of a mounting member and taper angle β of a taper portion of a sensor-mounting seat.

As shown in FIG. 5, $\alpha$ represents the taper angle (fanning-out angle) of the third mounting seat 245 of the third mounting member 204, and $\beta$ represents the taper angle (fanning-out angle) of a taper portion 83 of a sensor-mounting seat 81 of an exhaust pipe 85. For convenience of illustration, FIG. 5 shows only the third mounting member 204, not the entire temperature sensor, and a simplified section of the sensor-mounting seat 81 of the exhaust pipe 85.

For example, in the case where the relation "$\alpha<\beta$" is established, the third mounting member 204 rests on the sensor-mounting seat 81 such that a tip end portion of the taper surface of the third mounting seat 245 abuts the taper portion 83 of the sensor-mounting seat 81. Since the diameter of the abutment portion as measured on a cross section thereof taken perpendicular to the longitudinal direction becomes small, the outer diameter of the vibration-resisting reinforcement portion must be set small. This causes difficulty in obtaining a large outer diameter for the vibration-resisting reinforcement portion, resulting in difficulty in sufficiently increasing the strength of the vibration-resisting reinforcement portion.

By contrast, in the case where the relation "$\alpha>\beta$" is established, the third mounting member 204 rests on the sensor-mounting seat 81 such that a rear end portion of the taper surface of the third mounting seat 245 abuts the taper portion 83 of the sensor-mounting seat 81. Since the diameter of the abutment portion as measured on a cross section thereof taken perpendicular to the longitudinal direction becomes large, a large outer diameter can be set for the vibration-resisting reinforcement portion.

Accordingly, when the taper angle $\alpha$ of the mounting seat is to be set different from the taper angle $\beta$ of the taper portion of the sensor-mounting seat, the mounting member is designed to establish the relation "$\alpha>\beta$". This enables a sufficient increase in strength of the vibration-resisting reinforcement portion and allows for a modification in the resonance frequency of the temperature sensor.

The mounting member is not necessarily such that the joint portion and the vibration-resisting reinforcement portion are integrally formed. The mounting member may be formed such that the joint portion and the vibration-resisting portion are formed into a single member, and then the resultant member is joined (for example, by welding or brazing) to the side of the mounting member on which the mounting seat is formed. Alternatively, the mounting member may be formed such that the joint portion, the vibration-resisting reinforcement portion and a mounting member are formed as separate members, and then these members are appropriately joined together (for example, by welding or brazing).

The structure of the vibration-resisting reinforcement portion is not limited to a stepless structure. The vibration-resisting reinforcement portion may have a two or more stepped structure so long as the vibration-resisting reinforcement portion has a diameter greater than the maximum outer diameter of the joint portion and smaller than the maximum outer diameter of the mounting seat.

This application is based on Japanese Patent Application Nos. 2004-194187 filed Jun. 30, 2004 and 2005-36198 filed Feb. 14, 2005, the above-noted applications incorporated herein by reference in their entirety.

What is claimed is:

1. A temperature sensor comprising:
   a temperature-sensitive element having an electric characteristic that varies with temperature;
   a sheath member extending in an axial direction and having a metal core wire connected at a tip end thereof to the temperature-sensitive element, and connected at a rear end thereof to a lead wire for connection to an external circuit;
   a metal cap accommodating the temperature sensitive element therein, and joined to a tip end portion of the sheath member;
   a mounting member having a supporting portion supporting the sheath member, and a mounting seat adapted to abut a sensor-mounting seat directly or indirectly via another member;
   a joint portion having an outer diameter smaller than a maximum outer diameter of the mounting seat, joined to a portion of the sheath member located closer to the metal cap than the supporting portion and the mounting seat;
   a vibration-resisting reinforcement portion having an outer diameter greater than a maximum outer diameter of the joint portion and smaller than the maximum outer diameter of the mounting seat, and surrounding a portion of the sheath member arranged between the mounting seat and the joint portion; and
   a threaded portion arranged on one or the other axial side of the mounting seat,
   wherein a tip end projection length as measured between the mounting seat of the mounting member and a tip end of the metal cap is 20 mm or more.

2. The temperature sensor as claimed in claim 1, wherein a longitudinal length of the vibration-resisting reinforcement portion is 20% to 60% of the tip end projection length.

3. The temperature sensor as claimed in claim 1, wherein a difference between an outer diameter of the portion of the sheath member surrounded by the vibration-resisting reinforcement portion and an inner diameter of the vibration-resisting reinforcement portion is 0 mm to 0.3 mm.

4. The temperature sensor as claimed in claim 1, wherein the joint portion and the vibration-resisting reinforcement portion are integrally formed with the mounting member.

5. The temperature sensor as claimed in claim 1, wherein the threaded portion is arranged at a front side of the mounting seat.

6. The temperature sensor as claimed in claim 1, further comprising a hexagonal nut portion, and the mounting seat is formed as a front end surface of the hexagonal nut portion.

7. The temperature sensor as claimed in claim 1, wherein the threaded portion is arranged at a rear side of the mounting seat.

8. The temperature sensor as claimed in claim 1, wherein the mounting member further comprises a projection projecting radially outward, and the mounting seat is formed on a tip end side of the projection.

9. The temperature sensor as claimed in claim 1, wherein the mounting seat is adapted to airtightly abut the sensor-mounting seat.

10. A temperature sensor comprising:

an axially extending metal tube;

a temperature-sensitive element accommodated in a tip end portion of the metal tube and having an electric characteristic that varies with temperature;

a mounting member having a supporting portion supporting the metal tube, and a mounting seat adapted to abut a sensor-mounting seat directly or indirectly via another member;

a joint portion having an outer diameter smaller than a maximum outer diameter of the mounting seat and joined to a portion of the metal tube located on a side toward a tip end of the temperature sensor with respect to the mounting seat;

a vibration-resisting reinforcement portion having an outer diameter greater than a maximum outer diameter of the joint portion and smaller than the maximum outer diameter of the mounting seat and surrounding a portion of the metal tube arranged between the mounting seat and the joint portion; and a threaded portion arranged on one or the other axial side of the mounting seat, wherein a tip end projection length as measured between the mounting seat of the mounting member and a tip end of the metal tube is 20 mm or more.

11. The temperature sensor as claimed in claim 10, wherein a longitudinal length of the vibration-resisting reinforcement portion is 20% to 60% of the tip end projection length.

12. The temperature sensor as claimed in claim 10, wherein a difference between an outer diameter of the portion of the metal tube surrounded by the vibration-resisting reinforcement portion and an inner diameter of the vibration-resisting reinforcement portion is 0 mm to 0.3 mm.

13. The temperature sensor as claimed in claim 10, wherein the joint portion and the vibration-resisting reinforcement portion are integrally formed with the mounting member.

14. The temperature sensor as claimed in claim 10, wherein the threaded portion is arranged at a front side of the mounting seat.

15. The temperature sensor as claimed in claim 10, further comprising a hexagonal nut portion, and the mounting seat is formed as a front end surface of the hexagonal nut portion.

16. The temperature sensor as claimed in claim 10, wherein the threaded portion is arranged at a rear side of the mounting seat.

17. The temperature sensor as claimed in claim 10, wherein the mounting member further comprises a projection projecting radially outward, and the mounting seat is formed on a tip end side of the projection.

18. The temperature sensor as claimed in claim 10, wherein the mounting seat is adapted to airtightly abut the sensor-mounting seat.

* * * * *